Aug. 18, 1970  N. D. PETERSON  3,525,048

PROCESS INSTRUMENTATION SYSTEM WITH DYNAMIC COMPENSATOR

Filed Feb. 1, 1968

INVENTOR
*Neal D. Peterson*
BY
*Robertson, Bryan, Parmelee & Johnson*
ATTORNEYS

United States Patent Office 3,525,048
Patented Aug. 18, 1970

3,525,048
PROCESS INSTRUMENTATION SYSTEM WITH DYNAMIC COMPENSATOR
Neal D. Peterson, Foxboro, Mass., assignor to The Foxboro Company, Foxboro, Mass.
Filed Feb. 1, 1968, Ser. No. 702,386
Int. Cl. H03f *21/00;* H03g *3/00*
U.S. Cl. 330—1       15 Claims

ABSTRACT OF THE DISCLOSURE

An industrial process control system including a dynamic compensator comprising a high-gain operational amplifier with two input terminals one of which is supplied with a measurement signal transmitted through an R-C network to provide predetermined frequency-selective characteristics, the amplifier having a negative feedback circuit coupling the output signal to the other input terminal and including a second R-C network to provide further frequency-selective characteristics in the output signal; in another embodiment the second input terminal of the amplifier is coupled to a second input circuit supplying an adjustable-magnitude input signal to produce a controllable ratio signal in the amplifier output, there being provided a bias circuit which introduces an adjustable bias signal into the input of the amplifier, the supply current for such bias signal also being directed through the second input circuit in such a way as to oppose and thereby suppress a corresponding live-zero input current in the second input circuit.

---

This invention relates primarily to industrial process instrumentation systems such as those wherein a process condition is to be maintained at a preselected set value in the face of changing load conditions. More particularly, this invention concerns such instrumentation systems having signal converter means adapted to produce an output signal which is related to its input signal in accordance with a predetermined adjustable characteristic function ordinarily including a frequency-sensitive characteristic.

Many modern process control systems require special means to develop control signals in accordance with unique characteristic functions. For example, in feed-forward control systems used with distillation columns to insure maintenance of product quality, it has been found desirable to alter or compensate the feed-forward control signal so as to produce certain dynamic effects matching the response characteristics of the column. The desired characterizing effects typically may include phase lead and/or lag functions, as well as adjustment of the magnitude of the control signal, i.e., a so-called "ratio" adjustment, and the introduction of fixed but adjustable bias. Although various compensator devices and instruments have been used heretofore for such purposes, they have not been entirely satisfactory in operation nor properly suited for the intended applications, primarily because they were unable to meet certain requirements uniquely applicable to such instruments.

One of the special requirements for such compensation devices is that the zero-frequency gain must not change significantly, e.g., with changes in temperature. This is particularly important in feed-forward control systems where the corrective action of feedback control is either missing or not adequate for assuring accurate control. The problem is acute in compensators providing frequency-sensitive circuits having long time-constants (e.g., up to 60 minutes), because the very high ohmic value resistor elements used in such circuits typically have large temperature coefficients, and when used in conventional circuit configurations tend to alter the zero-frequency gain with changes in ambient temperature. In addition, prior compensator instruments have not satisfactorily solved the problem of providing bias signals which can be adjusted in magnitude without affecting the overall ratio (gain) setting.

Accordingly, it is a principal object of this invention to provide a control system compensator which is superior to such devices available heretofore. Another object of this invention is to provide such a compensator having improved operating characteristics. Other specific objects, aspects and advantages of the invention will in part be pointed out in, and in part apparent from, the following description, considered together with the accompanying drawings, in which.

Figure 1:
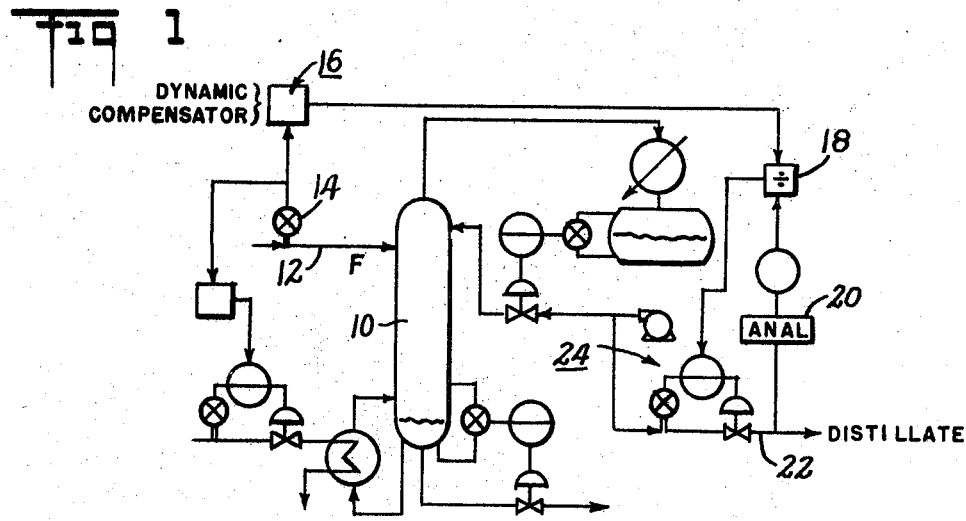
FIG. 1 is a diagrammatic showing of a feed-forward control system.

Referring first to FIG. 1, there is shown in outline form a system for controlling the operation of a distillation column 10. The basic arrangement of this control system is known in the art, and is described in detail in an article by F. G. Shinskey in The Oil and Gas Journal of Apr. 12, 1965. As set forth in that article, the rate of feed F entering the column via a conduit 12 is sensed by a measuring instrument 14 which produces a measurement signal directed to a dynamic compensator in the form of a signal converter 16. The output signal of this converter is sent to a divider 18, which alters the output signal in accordanhce with product quality measurements made by an analyzer 20 coupled to the distillate output line 22. The so-altered compensator signal is applied to a feedback flow controller 24 to set the flow rate of the distillate from the column.

The basic function of this control system is to vary the distillate flow rate with changes in the feed rate F. A simple proportional control variation does not provide sufficiently precise results in maintaining product quality, because the dynamic behavior of the column is not suitably matched by such a proportional control. The needed time-variant compensation is introduced by the dynamic compensator 16 which alters the feed-forward control signal so as to match more nearly the unique characteristics of the particular column being controlled.

Figure 2:
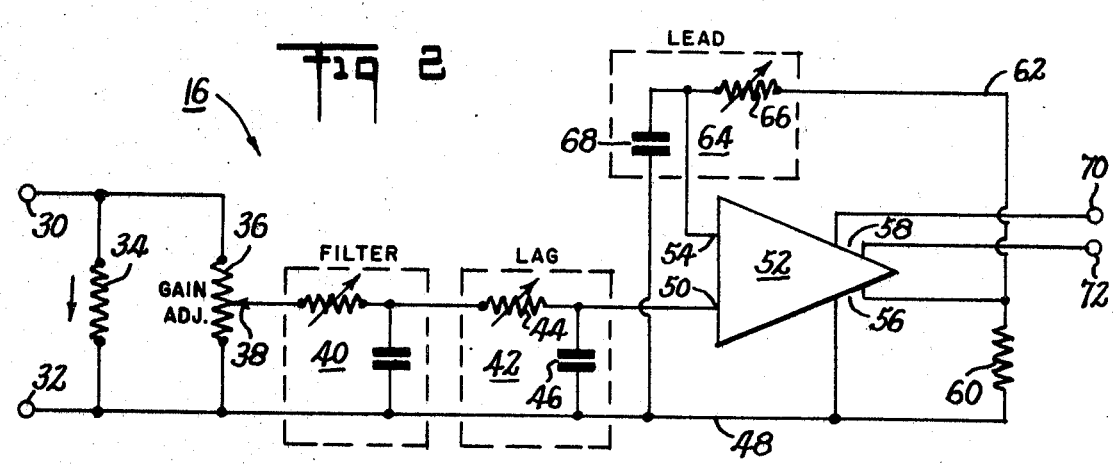
FIG. 2 is a schematic diagram of a dynamic compensator providing certain features of this invention.

FIG. 2 shows details of one embodiment of a dynamic compensator 16 of the kind providing phase lead and/or lag characteristics suitable for control systems such as a feed-forward control system. This compensator comprises an input circuit 30, 32 adapted to receive an electrical input signal, for example a feed rate measurement signal produced by the measuring instrument 14 in FIG. 1. In the compensator embodiment of FIG. 2, the input signal is in the form of a D-C current ranging from 10 milliamps to 50 milliamps for full scale variations.

The input circuit 30, 32 leads to a fixed resistor 34 (200 ohms) in parallel with a potentiometer 36 (5K ohms). The flow of input current through resistor 34 produces a corresponding voltage signal, and a portion of this signal is picked off by adjustable potentiometer tap 38 and directed to an R-C filter circuit 40. This filter circuit provides a time-constant settable in the range of 0 to 10 seconds, and serves to minimize spurious noise in the control circuitry.

The signal developed at the output of filter 40 is applied to an R-C lag network 42 consisting of a series resistor 44 of very high ohmic resistance (200 megohms) and a shunt capacitor 46 (18 mfd.) the lower plate of which is connected to a common circuit lead 48. The resistor 44 is adjustable to provide R-C time-constants in the range of 0.2 to 60 minutes. The output of the lag network 42 is applied to one input terminal 50 of an operational amplifier generally indicated at 52 and having a second input terminal 54. This amplifier preferably is of the type disclosed in copending application Ser. No. 507,765, filed by D. A. Richardson et al. on Nov. 5, 1965, having a gain of 2,000 and an input impedance of several thousand megohms as measured between terminals 50 and 54.

As described in said copending Richardson et al. application, amplifier 52 is provided with two conductively isolated output circuits 56 and 58 both of which produce D-C currents proportional in magnitude to the input voltage applied between the amplifier input terminals. The amplifier current developed in output circuit 56 flows through a feedback resistor 60 to produce a D-C feedback voltage on a lead 62. This feedback voltage is directed to an adjustable R-C lead network 64 consisting of a series resistor 66 of very high ohmic resistance (200 megohms) and a shunt capacitor 68 (18 mfd.) the lower plate of which is connected to common lead 48. Resistor 66 is adjustable to provide R-C time-constants in the range of 0.2 to 60 minutes.

The time-variant feedback signal produced by lead network 64 is applied to the upper amplifier input terminal 54 and serves to maintain the voltage differential between the input terminals at effectively zero. The magnitude of feedback voltage developed across resistor 60 to achieve such null balance at the amplifier input represents the output signal of the compensator 16, and a corresponding output current is developed by output circuit 58 through terminals 70 and 72. Conventionally, the output current will be in the range of 10 to 50 ma., and is effective to drive loads up to about 600 ohms.

An important requirement applicable to such dynamic compensators is that the zero frequency D-C gain be quite stable, e.g., with changes in environmental conditions such as temperature. This is especially true for compensators used in feed-forward control systems, because the D-C gain may have a direct effect on the magnitude of the corrective adjustment made to the process, and feedback action normally cannot be relied on to compensate satisfactorily for errors in the feed-forward adjustment setting. The problem is particularly acute in dynamic compensators designed to provide time-variant effects having very long time-constants and thus requiring resistors of very high ohmic value. This is because in circuit arrangements used heretofore for such purposes, the zero-frequency gain is dependent upon the magnitude of the ohmic values of the resistors used in the time-constant networks, and conventional high-resistance elements have an unduly large temperature coefficient. Of course, precision resistors of special construction can be used to alleviate the problem, but such devices are relatively expensive and not a satisfactory solution to the problem.

One of the significant advantages of the arrangement shown in FIG. 2 is that the zero-frequency gain of the compensator is not importantly affected by the magnitude of the variable resistors 44 and 66 in the lag and lead networks 42 and 64, respectively. This is because the circuit provides extremely high impedance between amplifier input terminal 54 and ground. That is, with each of the networks 42 and 64 coupled to a respective input terminal 50 and 54, the extremely high input impedance of the amplifier is interposed between the two networks and, in addition, the capacitor 68 presents a very high leakage resistance to ground; this assures true follower action. Thus the net gain of the amplifier is not determined by the relative values of input and feedback currents introduced to a common summing junction, but is determined instead by the feedback connection arrangement, in conjunction with the setting of potentiometer 36. In a practical embodiment of this invention, the zero-frequency error due to a 50° F. change in ambient temperature was held to within 0.5% of the input span.

Figure 3:
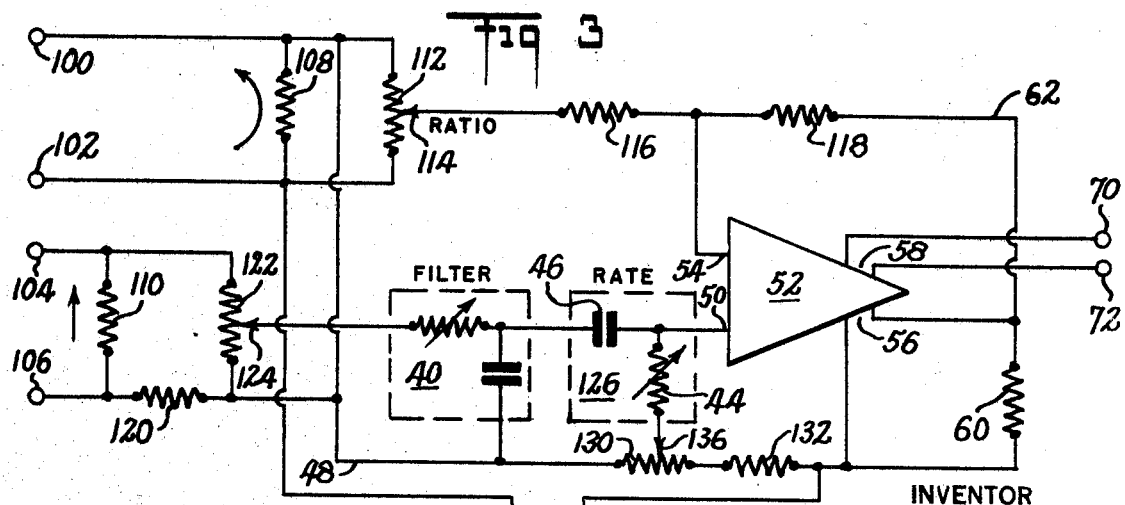
FIG. 3 is a schematic diagram of a modified form of compensator.

In FIG. 3 there is shown a modified embodiment of the present invention adapted to provide both a rate function (sometimes referred to as an "impulse" function) in combination with a D-C ratio function of adjustable magnitude. This embodiment includes two input circuits 100, 102 and 104, 106, each leading to a corresponding fixed resistor 108 and 110 (200 ohms) to develop input voltages corresponding to respective input currents in the range of 10 to 50 milliamps. The input voltage developed by resistor 108 is applied to a potentiometer 112 (5K) the adjustable tap 114 of which is connected to one end of a series feedback circuit consisting of a pair of resistors 116 and 118 (100K and 1 meg. respectively). The input voltage developed across the other fixed resistor 110 is directed through an isolating resistor 120 (5K) to a potentiometer 122 (5K).

A portion of the voltage applied to potentiometer 122 is picked off by its tap 124 and directed through adjustable filter 40 to an R-C rate network 126. Advantageously, this rate network is comprised of the same components 44 and 46 as in lag network 42 of FIG. 2, but with capacitor 46 in a series position and resistor 44 in a shunt position coupled to the common circuit lead 48. The rate signal developed by network 126 is applied to the lower input terminal 50 of amplifier 52.

The amplifier output current flowing through output circuit 56 develops across feedback resistor 60 a feedback voltage directed through line 62 to the other end of the feedback circuit consisting of resistors 116 and 118. The common junction of these two resistors is connected to the upper amplifier input terminal 54. The negative feedback action thus developed serves as before to maintain the differential voltage between terminals 50 and 54 effectively at zero.

The FIG. 3 embodiment also includes input signal biasing means including a potentiometer 130 and a series resistor 132 supplied with constant current (10 milliamps) by a regulated current supply 134. The tap 136 of potentiometer 130 is connected to the lower end of resistor 44. Thus it will be seen that the voltage applied to the input of the amplifier 52 includes not only signals derived from potentiometers 112 and 122, but also a fixed but adjustable bias voltage derived from potentiometer 130.

In the FIG. 3 embodiment, the ratio setting (gain) of the compensator is determined by the ratio of the feedback resistors 116 and 118, in conjunction with the setting of the ratio potentiometer 112. The ratio of feedback resistors 116 and 118 also controls the impulse gain, i.e., the amplification of a signal applied to rate circuit 46. Since no time-constant circuits are in the feedback path, resistors 116 and 118 are of relatively low ohmic value. Thus it is possible to employ resistors having suitable temperature characteristics and yet of modest cost.

In accordance with another important aspect of the disclosed compensator arrangement, the fixed magnitude current flowing through the bias potentiometer 130 also is directed through the parallel combination of the fixed resistor 108 and potentiometer 112 of the ratio input circuit. This biasing current thereby serves the additional purpose of bucking out or "suppressing" the elevated zero (10 milliamps) of the applied input signal, so as to provide a signal with a true zero suitable for amplification to obtain an output signal with the desired ratio characteristic. A special feature of this biasing arrangement is that the zero-frequency gain of the compensator (i.e., the effective ratio setting) is independent of the setting of the bias potentiometer 130. Thus changes can be made to the bias voltage without requiring any corresponding alteration in the adjustment of the ratio potentiometer 112.

As described in the above-identified Richardson et al. application, the amplifier 52 preferably is provided with output current limiting to prevent the control signal from either exceeding a given value, or going below another given value. In a preferred embodiment, the high limit was adjustable to any value within the range of 30 to 55 ma., and the low limit similarly was adjustable to any value within the range of 5 to 30 ma. One form of suitable limiting circuitry for this purpose is described in the Richardson et al. application.

Although specific embodiments of the invention have been described herein in detail, it is desired to emphasize that this is for the purpose of illustrating the invention and is not to be considered as necessarily limiting thereof. Modifications to the disclosed apparatus within the scope of this invention will of course be apparent to those skilled in the art, in accordance with the requirements of particular applications.

I claim:

1. In an industrial process instrumentation system, an electronic dynamic compensator adapted to receive an electrical input signal and to produce a corresponding electrical control signal related to the input signal by a predetermined but adjustable characteristic function and with high zero-frequency accuracy, said compensator comprising:
   an input circuit arranged to receive said input signal;
   a high-gain amplifier having a pair of input terminals leading to a high-impedance circuit adapted to control the amplifier output without requiring any substantial amplifier input current;
   a first high-impedance frequency-sensitive network coupling said input circuit to one of said amplifier input terminals to apply thereto a signal corresponding to said input signal but with time-variant modifications responsive to changes in said input signal;
   an output circuit for said amplifier to produce an output signal responsive to changes in said input signal;
   a negative feedback circuit coupling said output circuit to said other amplifier input terminal and serving to maintain the voltage differential between said input terminals effectively at zero;
   a second high-impedance frequency-sensitive network connected in series with said negative feedback circuit to effect time-variant modifications in the magnitude of the feedback signal responsive to changes in said output signal;
   and circuit means coupled to the output of said amplifier to produce a control signal corresponding to said output signal.

2. Apparatus as claimed in claim 1, wherein each of said frequency-sensitive networks comprises at least one series resistor of very high ohmic value, said resistor in said first frequency-sensitive network being connected to one of said amplifier input terminals and said resistor in said second frequency-sensitive network being connected to the other of said amplifier input terminals.

3. Apparatus as claimed in claim 2, wherein said compensator includes a common circuit lead coupled between said output circuit and one terminal of said input circuit, at least one of said frequency-sensitive networks including a shunt capacitor connected between the corresponding series resistor and said common circuit lead.

4. Apparatus as claimed in claim 3, wherein both of said frequency-sensitive networks includes a shunt capacitor connected between the corresponding series resistor and said common circuit lead, said first network providing a phase lag characteristic and said second network providing a phase lead characteristic.

5. Apparatus as claimed in claim 4, wherein said series resistors are adjustable to provide presettable function characteristics between the input and output of said compensator.

6. Apparatus as claimed in claim 1, wherein said instrumentation system is a feed-forward process control system including measurement means providing a measurement signal for said compensator input circuit;
   and operating means responsive to said control signal, said operating means including means to adjust a process variable in correspondence with changes in said control signal so as to minimize the changes in a related process condition with changes in said measurement signal.

7. In an industrial process instrumentation system, an electronic signal converter adapted to receive an electrical input signal and to produce a corresponding electrical control signal related to the input signal by a predetermined adjustable characteristic function, said converter comprising:
   an input circuit connected to said input signal in the form of a current providing an elevated zero, said input circuit including resistor means for converting said current to a corresponding voltage signal;
   a high-gain amplifier having a pair of input terminals;
   a bias circuit comprising potentiometer means having a variable voltage tap device to provide an adjustable bias voltage;
   first circuit means connecting one end of said input circuit resistor means to said potentiometer means in a series configuration;
   second circuit means coupling said potentiometer tap device and the other end of said resistor means to said amplifier input terminals respectively to apply to said amplifier an input voltage responsive to both said input signal and the bias voltage developed by said bias circuit;
   a current source producing a current of fixed magnitude;
   and means connecting said current source to the series combination of said resistor means and said potentiometer means to (1) energize said potentiometer means and produce said bias voltage, and (2) oppose the input current flowing through said resistor means and suppress the elevated zero signal thereof.

8. Apparatus as claimed in claim 7, wherein said second circuit means includes second potentiometer means to adjust the magnitude of the amplifier input voltage derived from said input current.

9. Apparatus as claimed in claim 7, wherein said second circuit means includes a negative feedback circuit having two series resistors adapted to fix the amplifier gain in accordance with the ratio of the ohmic values of the two resistors.

10. In an industrial process instrumentation system, an electronic signal converter adapted to receive two electrical input signals and to produce a corresponding electrical control signal related to the input signals by a predetermined characteristic function, said converter comprising:
   a first input circuit arranged to receive a first input signal in the form of a current and including first resistor means for converting the current to a corresponding first voltage signal;
   a second input circuit arranged to receive a second input signal in the form of a current and including second resistor means for converting the current to a corresponding second voltage signal;
   a high-gain amplifier having a pair of input terminals;
   a common circuit lead for said amplifier and connected to one terminal of each of said input circuits;
   first circuit means coupling the other terminal of said first input circuit to one of said amplifier input terminals, said first circuit means including a frequency-sensitive network coupled to said common circuit lead; and
   second circuit means coupling the other terminal of said second input circuit to the other amplifier input terminal, said second circuit means including a negative feedback circuit having first and second resistance means fixing the gain of said amplifier.

11. Apparatus as claimed in claim 10, wherein said frequency-sensitive network includes a series capacitor and a shunt resistor to provide rate-responsive action in the compensator output signal.

12. Apparatus as claimed in claim 10, wherein said first and second input circuits include potentiometer means to adjust the magnitude of the corresponding input voltage.

13. Apparatus as claimed in claim 10, including a bias voltage source connected between said common circuit lead and said feedback circuit.

14. Apparatus as claimed in claim 13, wherein said bias voltage source comprises a potentiometer means the adjustable tap of which is coupled to said one amplifier input terminal, and a current source coupled to said potentiometer means to develop a corresponding voltage across said potentiometer means.

15. Apparatus as claimed in claim 14, including means to direct the output of said current source through at least one of said input circuit resistor means, to suppress an elevated zero of the input signal.

References Cited
UNITED STATES PATENTS

| | | | |
|---|---|---|---|
| 2,361,593 | 10/1944 | Black | 330—109 X |
| 2,490,805 | 12/1949 | Hastings | 330—85 |

NATHAN KAUFMAN, Primary Examiner

U.S. Cl. X.R.
330—109, 136, 185